(12) United States Patent
Arber et al.

(10) Patent No.: US 8,702,892 B2
(45) Date of Patent: Apr. 22, 2014

(54) BONDING OF AIR-PLASMA TREATED THERMOPLASTICS

(75) Inventors: Willy Arber, Stadel b/Niederglatt (CH); Patrick Frey, Oberdiessbach (CH); Mario Slongo, Tafers (CH)

(73) Assignee: Sika Technology AG, Baar (CH)

( * ) Notice: Subject to any disclaimer, the term of this patent is extended or adjusted under 35 U.S.C. 154(b) by 930 days.

(21) Appl. No.: 11/884,003

(22) PCT Filed: Feb. 10, 2006

(86) PCT No.: PCT/EP2006/050854
§ 371 (c)(1),
(2), (4) Date: Jan. 30, 2009

(87) PCT Pub. No.: WO2006/084901
PCT Pub. Date: Aug. 17, 2006

(65) Prior Publication Data
US 2009/0226747 A1  Sep. 10, 2009

(30) Foreign Application Priority Data
Feb. 11, 2005 (EP) .................................. 05101035

(51) Int. Cl.
*B32B 37/02* (2006.01)
(52) U.S. Cl.
USPC .................................................. 156/275.7
(58) Field of Classification Search
USPC ................................ 156/272.2, 272.6, 275.7
See application file for complete search history.

(56) References Cited

U.S. PATENT DOCUMENTS

| 4,597,818 A * | 7/1986 | Aoyama et al. ............ 156/308.2 |
| 5,190,704 A * | 3/1993 | Katoh et al. ................... 264/446 |
| 5,440,446 A | 8/1995 | Shaw et al. |
| 5,545,419 A * | 8/1996 | Brady et al. .................. 426/129 |
| 5,837,958 A | 11/1998 | Fornsel |
| 6,057,414 A * | 5/2000 | Razavi ........................... 427/491 |
| 6,265,690 B1 * | 7/2001 | Fornsel et al. .............. 219/121.5 |
| 6,299,596 B1 * | 10/2001 | Ding ........................... 604/96.01 |
| 6,432,251 B1 * | 8/2002 | Fischer et al. .............. 156/272.6 |
| 6,830,782 B2 * | 12/2004 | Kanazawa ..................... 427/458 |
| 2001/0001284 A1 | 5/2001 | Shaw et al. |
| 2003/0145940 A1 * | 8/2003 | Chaudhury et al. ........ 156/272.6 |
| 2003/0161976 A1 * | 8/2003 | Rea et al. ...................... 428/35.7 |
| 2003/0181539 A1 * | 9/2003 | Baumgart et al. ............. 522/173 |
| 2004/0023022 A1 | 2/2004 | Inoue et al. |
| 2005/0016673 A1 * | 1/2005 | Krebs et al. ................ 156/275.7 |

FOREIGN PATENT DOCUMENTS

| EP | 0 761 415 A2 | 3/1997 |
| EP | 0 896 992 A1 | 2/1999 |
| EP | 1 318 013 A1 | 6/2003 |
| EP | 1 335 641 A1 | 8/2003 |
| WO | WO 96/038311 A1 | 12/1996 |
| WO | WO 03/048067 A1 | 6/2003 |

OTHER PUBLICATIONS

Kinloch, "Adhesion and Adhesives: Science and Technology," 1987, New York: Chapman and Hall, p. 131-135.
Occhiello et al., "Hydrophobic recovery of oxygen-plasma-treated polystyrene," *Polymer*, 1992, vol. 33, No. 14, p. 3007-3015.
Occhiello et al., "Oxygen-Plasma-Treated Polypropylene Interfaces with Air, Water, and Epoxy Resins: Part I. Air and Water," *Journal of Applied Polymer Science*, 1991, vol. 42, p. 551-559.
Dorn et al., "Einfluss der Liegezeit auf die Haftfestigkeit vorbehandelter PCO-Folien," *Adhäsion, Kleben & Dichten*, 2001, vol. 45, No. 3, p. 43-45.
Aug. 24, 2010 Office Action issued in Japanese patent application No. 2007-554567 (with translation).
Oct. 20, 2005 EPO Search Report issued in European patent application No. EP 05 10 1035 (with translation).

* cited by examiner

*Primary Examiner* — Daniel McNally
(74) *Attorney, Agent, or Firm* — Oliff PLC

(57) ABSTRACT

The invention relates to a method which allows a long-term bonding of thermoplastics. The air-plasma treatment at atmospheric ambient pressure allows very long storage times, up to several years. The inventive method allows to glue thermoplastics, stored under various storage conditions, for a long term without any noticeable decrease in adhesive strength.

13 Claims, No Drawings

BONDING OF AIR-PLASMA TREATED THERMOPLASTICS

TECHNICAL FIELD

The present invention is concerned with the bonding of thermoplastics.

PRIOR ART

In connection with the bonding of plastics a problem arising widely and frequently is that the bonding of these plastics is poor. Consequently pretreatments are widely and frequently used. Used on the one hand are undercoats, known as primers, which fulfill adhesion-promoting functions. Such primers, however, are usually based on solvents. Used on the other hand, widely and frequently, is cleaning with solvent or partial swelling by solvent. On the basis of occupational hygiene and technical safety grounds, however, solvent-based pretreatments of this kind are widely and frequently unwanted. Furthermore, physical, or physicochemical, pretreatment methods are known which are used to increase the adhesion. These include, in particular, corona treatment, flame treatment, and various plasma treatments. It has nevertheless emerged that, within hours after the pretreatment, the surfaces of these polymers undergo the most massive changes, as has been shown, for example, by A. J. Kinloch in "*Adhesion and Adhesives*", Chapman and Hall, New York, 1987, 132-133 or in the studies by Garbassi et al. in *Polymer*, 33, 3007-3015 (1992) or *J. Appl. Polym. Sci.*, 42, 551-559 (1991) for $O_2$-plasma-treated polystyrene and polypropylene, respectively, on the basis of the change in contact angle. L. Dorn in *Adhäsion, Kleben & Dichten*, 3, 43-45 (2001) describes for example how for PCO films treated with corona or low-pressure plasma, after a lying time of just a few hours, there is a drastic drop in the peel resistance of specimens bonded using epoxy resin adhesives.

Thermoplastics therefore have the great disadvantage that surfaces pretreated in this way must be bonded within a short time after the pretreatment, referred to as the "lying time", in order to achieve reliable adhesion.

EXPOSITION OF THE INVENTION

It is an object of the present invention, therefore, to pretreat thermoplastic materials in such a way that they can be bonded over the long term. This object has been achieved, surprisingly, with a method as described herein and also with a use as described herein.

Thermoplastics treated in this way with air-plasma at atmospheric ambient pressure exhibit an extraordinary prolongation of their bondability and surprisingly can still be bonded without a marked reduction in adhesive strength over very long lying times, which can be up to years, even under different storage conditions.

EMBODIMENTS OF THE INVENTION

The present invention relates on the one hand to a method of bonding two substrates S1 and S2 by means of adhesives. At least the substrate S1 here is a thermoplastic film which is or comprises a copolymer CP of at least two monomers selected from the group encompassing vinyl acetate, vinyl alcohol, styrene, ethylene, propylene, butadiene, esters of (meth)acrylic acid and mixtures thereof. The method here comprises the following steps:

(i) treating the thermoplastic film S1 with an air-plasma at atmospheric ambient pressure at least in the region to be bonded
(ii) applying an adhesive to the air-plasma-pretreated film surface S1 or to the surface of the substrate S2
(iii) carrying out joining with the substrate S2 or with the air-plasma-pretreated film surface S1 within the adhesive's open time
(iv) curing the adhesive.

The said copolymer CP is composed of at least two monomers; in particular it is a copolymer CP of two or three of the stated monomers. Preferred copolymers CP have been found to be those prepared from at least two monomers selected from the group encompassing ethylene, vinyl acetate, (meth)acrylates, styrene, acrylonitrile and mixtures thereof. The copolymer CP is preferably an amorphous thermoplastic. Particularly preferred copolymers CP are ethylene/vinyl acetate copolymers (EVA) and (meth)acrylate/styrene/acrylonitrile copolymers. The most preferred is EVA.

As further constituents of the thermoplastic film there may be further constituents present. These are in particular, besides other thermoplastics, the processing agents and constituents that are typical of films, such as, for example, fillers, additives such as UV stabilizers and heat stabilizers, plasticizers, lubricants, drying agents, flame retardants, antioxidants, pigments, and dyes.

Further thermoplastics are, more particularly, polyolefins, especially polyethylene, polypropylene, and ethylene/propylene copolymers; polyvinyl chloride, chlorinated polyolefins, such as chlorinated polyethylenes (CPE), or chlorosulfonated polyethylenes. Particularly preferred additional thermoplastics are on the one hand polyethylene, more particularly polyethylene prepared using metallocenes, and also chlorosulfonated polyethylenes. The most preferred are chlorosulfonated polyethylenes, more particularly of the kind available commercially under the trade name Hypalon® from the company DuPont.

The thermoplastics are preferably amorphous thermoplastics.

Fillers which have proven appropriate are chalks, especially coated chalks, carbon black, titanium dioxides, aluminum oxides, silicon oxides, and silicates, preferably chalks.

The films preferably have thicknesses of more than 0.5 mm, more particularly of at least 1 mm, preferably between 1 and 5 mm, most preferably between 1 and 2 mm. The film is preferably in the form of a roll.

Films which have proven particularly advantageous are those which in addition to at least one copolymer CP comprise at least one further thermoplastic and at least one filler. With particular preference both the copolymer CP and the further thermoplastic are each an amorphous thermoplastic. Films which are particularly suitable are those which besides an EVA as copolymer CP comprise a chlorosulfonated polyethylene as further thermoplastic and preferably at least one filler.

It has emerged that films of this kind exhibit extremely advantageous welding behavior and are notable for the absence of the surface changes which are caused by moisture effects, are typical of chlorosulfonated polyethylenes, and are known to the skilled films worker by the term "orange peel".

The weight ratio of further thermoplastics to copolymer CP amounts to a value between 0 to 40, in particular between 0.5 and 20.

The fraction of fillers is between 0% and 70% by weight, more particularly between 5% and 60% by weight, based on the weight of the film.

Particularly suitable films are Hypalon®/EVA-based films, which are available commercially under the trade name Sikadur®-Combiflex® tape and strips from Sika Schweiz AG.

The thermoplastic film is preferably elastic and in particular has a breaking extension of between 200% and 800%.

The thermoplastic film is treated with an air-plasma at atmospheric ambient pressure at least in the region to be bonded.

An air-plasma at atmospheric ambient pressure comes about via nonthermal discharge from a working gas, which is air, when a high voltage of high frequency is applied in a nozzle pipe between two electrodes. This operating gas is preferably under atmospheric pressure or slightly elevated pressure. In contrast to other plasma pretreatments, the air-plasma treatment used here is carried out at atmospheric ambient pressure. This brings with it the great advantage that there is no need for a chamber and that, consequently, this technique can even be used outside of industrial applications, so that even relatively large bodies can readily be treated with the air-plasma. The working gas is air. The air is preferably used in the form of compressed air. In that case it is preferred to use a pressure between 2 and 10 bar. The plasma emerges at the nozzle opening and is directed onto the substrate to be treated. A characteristic of a plasma of this kind is that the plasma is of high energy but low temperature. Moreover, it features a high electron temperature and a low ion temperature. Plasma sources of this kind for generating an air-plasma at atmospheric ambient pressure are described in detail in EP 0 761 415 A1 and EP 1 335 641 A1, and are available commercially from the company Plasmatreat GmbH, Steinhagen, Germany, where they are used for the so-called OpenAir® Plasma Technology. Systems are possible with one plasma nozzle or two or more plasma nozzles rotating at very high speeds, which are referred to below as "rotating nozzles".

It has emerged that especially good results were obtained when at least one, more particularly at least two, rotating nozzles are used. The distance between the substrate surface to be treated and the nozzle is advantageously between 3 mm and 20 mm, more particularly between 5 mm and 9 mm. To the skilled worker it is clear that two or more nozzles may be located alongside one another or else behind one another. The substrate to be treated is treated with a relative velocity in relation to the plasma source (without taking into account any rotational velocity of a rotating nozzle) of between preferably 5 and 50 m/min, more particularly between 10 and 25 m/min, preferably between 10 and 15 m/min. In one embodiment the nozzle is moved and the substrate to be treated is preferably not. This can take place, for example, by means of a robot. A treatment form of this kind is selected especially when the substrate to be treated has a complex form, more particularly when it is a three-dimensional body, or when treatment in relatively complex patterns is required. Here it is advantageous to carry out computer-controlled screen application of the air-plasma treatment. In another embodiment the substrate to be treated is moved relative to a stationary plasma source. This embodiment is used preferably in the case of films, more particularly full-area treatment or on large films, in particular from rolls. The treatment width per nozzle is preferably between 20 and 120 mm, more particularly between 25 and 100 mm. Regions broader than the treatment width of one nozzle are preferably treated by means of two or more adjacent nozzles with air-plasma.

The substrate can be given a full-area or part-area treatment with the air-plasma. It is possible, for example, to treat only those locations at which bonding subsequently takes place. Depending on the nature of the subsequent use, part-area or full-area bonding is possible. For a film it may also be advantageous if both sides are treated with air-plasma. A double-sided air-plasma treatment of this kind can be accomplished by simultaneous placement of at least one plasma source per side, or first one side is treated as described with air-plasma, after which the film is reversed, and then the other side is likewise treated with air-plasma.

The air-plasma treatment does not necessitate heating or cooling of the substrate.

After the air-plasma treatment, thermoplastic films treated in this way can be converted, in particular by separation into lengths or by cutting to shape, or by winding. In the case of winding it can be advantageous to incorporate a release film between the plies. Release films of this kind may be composed of any of a very wide variety of materials, such as of polyethylene, polypropylene, PET, paper, Teflonized or siliconized plastics or papers, for example. These release films are advantageously inserted in the course of winding. The use of such release films, however, is not mandatory.

At a point in time after the air-plasma treatment of the thermoplastic an adhesive is used. In this case either the adhesive is applied to the substrate S2 and then joined to the air-plasma-treated substrate S1, or the adhesive is applied to the air-plasma-treated substrate S1 and then joined to the substrate S2.

It has emerged that polyurethane adhesives, (meth)acrylate adhesives, epoxy resin adhesives or adhesives based on alkoxysilane-functional prepolymers are ideally suited to adhesive bonding.

Suitable polyurethane adhesives are, on the one hand, one-component moisture-curing adhesives or two-component polyurethane adhesives. Adhesives of this kind contain polyisocyanates, in the form in particular of prepolymers containing isocyanate groups. Preference is given to polyurethane adhesives, of the kind sold commercially by Sika Schweiz AG under the product lines Sikaflex® and SikaPower®.

(Meth)acrylate adhesives are two-component adhesives whose first component comprises acrylic acid and/or methacrylic acid and/or esters thereof, and whose second component comprises a free-radical initiator, more particularly a peroxide. Preferred such adhesives are available commercially under the product line SikaFast® from Sika Schweiz AG.

By epoxy resin adhesives are meant adhesives which are formulated on the basis of glycidyl ethers, more particularly of diglycidyl ether of bisphenol A and/or bisphenol F. Particularly suitable are two-component epoxy resin adhesives one component of which comprises diglycidyl ethers of bisphenol A and/or bisphenol F and a second component of which comprises polyamines and/or polymercaptans. Preference is given to two-component epoxy resin adhesives of the kind available commercially under the product line Sikadur® from Sika Schweiz AG. Adhesives which have been found particularly suitable for bonding films are the two-component epoxy resin adhesives Sikadur®-Combiflex®, Sikadur®-31, Sikadur®-31DW, and Sikadur®-33, preferably Sikadur®-Combiflex®, from Sika Schweiz AG.

Adhesives based on alkoxysilane-functional prepolymers are, in particular, adhesives based on MS polymers or SPUR (silane-terminated polyurethane) prepolymers. Alkoxysilane-functional prepolymers of this kind can be prepared, for example, via a hydrosilylation reaction from at least two polyethers containing C=C double bond, more particularly from allyl-terminated polyoxyalkylene polymers, and with a hydrosilane or via an addition reaction of isocyanatoalkylalkoxysilanes with polyols or with hydroxy-functional polyurethane prepolymers, or via an addition reaction of aminoalkylalkoxysilanes with isocyanate-functional polyurethane prepolymers, the polyurethane prepolymers being obtainable in turn via a reaction of polyisocyanates and polyols and/or polyamines in a known manner. Adhesives based on alkoxysilane-functional prepolymers are moisture-curing and react at room temperature.

In principle it is also possible to use reactive hot melt adhesives. Preference is given, however, to room-temperature-curing adhesives.

Considered particularly preferred adhesives are two-component epoxy resin adhesives.

In one embodiment the adhesive is applied to the substrate S2 and then joined to the air-plasma-pretreated substrate S1. In another embodiment the adhesive is applied to the surface of the air-plasma-pretreated substrate S1 and then joined to the substrate S2. The former method is preferred especially when substrate S2 is a body with a large surface area. In the particularly preferred case of the sealing of joints and cracks, the adhesive is applied to the mineral substrate S2, more particularly concrete or masonry, and then the air-plasma-treated film S1 is placed on, so that the adhesive contacts the film. In the embodiment in which the substrate S2 is different from the substrate S1, it can be of advantage for the surface of the substrate S2 to be pretreated prior to bonding. Apart from a plasma treatment, more particularly an air-plasma pretreatment at atmospheric ambient pressure, the last-mentioned pretreatment may be an application of a primer or of an adhesion promoter composition and/or a mechanical cleaning operation. Where S2 is a mineral substrate, the mechanical cleaning operation, in particular brushing, abrading, sand blasting or shot blasting, is of great advantage. In the case of concrete as substrate S2, the removal of the so-called cement skin, in particular by means of abrading, sand blasting or shot blasting, and, if desired, the use of a primer as well, can be recommended as advantageous in order to ensure an effective and long-lived bond.

The substrate S2 can in principle be any of the materials suitable for the adhesive used. In addition to the same material as the substrate S1, suitable materials are, in particular, those such as glass, ceramic, metals, alloys, paints, plastics, or mineral materials as substrate S2. The substrate S2 is preferably a metal or an alloy, more particularly a steel or an aluminum, or a mineral material, more particularly concrete or masonry. With the substrate S2 it may be necessary to pretreat the surface of the substrate immediately prior to bonding. A pretreatment of this kind may be mechanical, chemical or physicochemical in nature, as already mentioned above.

After the joining comes the curing of the adhesive. The skilled worker is of course aware, however, that the crosslinking of the adhesive in the case of two-component adhesives begins as soon as after mixing, or, in the case of one-component polyurethane adhesives or adhesives based on alkoxysilane-functional prepolymers, immediately after contact with atmospheric moisture. Hence the term of curing in step (iv) is to be understood not as the beginning of cure, or beginning of crosslinking, but instead to the effect that the crosslinking has already progressed to a sufficient point that the adhesive already has sufficient strength that it is able to transmit forces, and has achieved what is called early strength. Curing is at an end when the adhesive has reached its ultimate strength.

It has emerged, surprisingly, that the thermoplastic substrates S1 pretreated as described above with air-plasma of atmospheric ambient pressure possess an extraordinary prolonged bondability. This is possible without the need for additional pretreatments, such as the application of primers, adhesive promoter compositions, or treatment by means of corona, plasmas or flaming.

It has been found that the bondability is retained for weeks, months or even years. This is in strong contrast to other known pretreatment methods, which feature a bondability ranging from a few hours to days. This property of the air-plasma-pretreated thermoplastics leads to the great technical and economic advantage that these thermoplastics can be efficiently treated with the air-plasma in large quantity at a central location, preferably in a film manufacturing plant, and subsequently, where appropriate after an extensive storage time, can be transported without haste to the location of bonding, where bonding can take place without problems and without further pretreatment, such as the application of primers or adhesive promoter compositions, or by surface reactivation by means of energy input or repeated plasma or corona pretreatment, of the thermoplastic. As compared with the other surface treatment methods, this brings with it the great advantage that at the location of bonding, a remote and difficult-to-access building site, for example, there is no need either to transport and install an air-plasma treatment system, or to expend extensive resources on logistics, in order to be able to ensure that a pretreated substrate can be transported and bonded within the short bondability time.

Bondability is ensured immediately after the air-plasma treatment at atmospheric ambient pressure, but is ensured for at least one week, more particularly at least one month, preferably at least one year. It is preferred for the air-plasma-treated thermoplastic not to be bonded immediately after the treatment but instead to be stored for at least one week, more particularly at least one month, preferably at least one year prior to bonding.

It has been found that this improvement in bondability is not restricted to storage under indoor climatic conditions, but instead that bondability exists even after storage for a comparable length of time at an elevated temperature, or after changes in climatic conditions, the bondability being comparable with that of freshly air-plasma-pretreated samples.

The prolongation of bondability as described herein is not confined to the shape of the bodies; consequently, a prolonged bondability was found not only with the above-described thermoplastic films but also with other two-dimensional bodies and other three-dimensional forms, such as three-dimensional moldings, made of such thermoplastics. Films, however, are a particularly preferred form of body, especially in the form of tapes or strips.

A particular sector in which the invention can be used is as a sealing film in the construction sector, more particularly in civil engineering. The sealing in question here is, in particular, the sealing of construction joints, flashing joints, expansion joints or settlement joints and also of cracks, and the refurbishment of leaky joints in buried components, in groundwater, in tunnels, shafts, masonry dams, wastewater systems, water reservoirs, and swimming pools. Films which have been found to be preferred for this sector are, in particular, thermoplastic films based on chlorosulfonated polyethylene and an EVA copolymer as copolymer CP in combination with a two-component epoxy resin adhesive featuring a first component comprising a bisphenol A diglycidyl ether and a second component containing a polyamine.

In this application the films, particularly in the form of tapes, are advantageously bonded in two ways.

In a first form, preferably in the case of expansion joints, the film is not bonded to the concrete over the full area, but instead only at its edges. The edges of the film are advantageously encompassed by adhesive on both sides. In order to ensure a good bond and the anchoring of the film in the adhesive, therefore, it is advantageous for this embodiment if the thermoplastic film has been pretreated with air-plasma on both sides, at least in the edge region. Over the expansion joint, therefore, the film is advantageously not covered with an adhesive. The advantageously elastic film can therefore comply with movements in the concrete or masonry parts bordering the expansion joints, the parts to which the film is, indeed, positively bonded by means of adhesive, and consequently is able to perform the crack-bridging sealing function.

In a second form, the thermoplastic film is bonded over a construction joint, or a crack, to form a bridge over the full area with the concrete or the masonry. In order to ensure optimum incorporation and protection of the film from damage, the film is advantageously also covered with adhesive on the side opposite the concrete or masonry. In this embodiment, therefore, the film is advantageously surrounded by adhesive on all sides. In order to ensure an effective bond and effective anchoring of the film in the adhesive, therefore, it is advantageous for this embodiment if the thermoplastic film has been pretreated with air-plasma on both sides.

EXAMPLES

1. Different Thermoplastics

Production

Approximately 150 g of the thermoplastic indicated in Table 1 were melted at a temperature between 150 and 170° C. in a Collin roll mill, mixed and rolled to form a sheet approximately 1.8 mm thick. The sheet was subsequently pressed to a film 1.5 mm thick by means of a plate press, heated to a temperature between 150 and 170° C., under a pressure of 80 kN, based on the surface of the press plates. Subsequently films were cut to dimensions of 280*200*1.5 mm.

Pretreatment

The films produced in this way were treated with an air-plasma at atmospheric ambient pressure by means of the Manutec-Agrodyn plasma generator from Plasmatreat GmbH. Plasma generation was carried out using air at 2.5 bar. A rotating nozzle with a diameter of 25 mm was used. By means of robots, the nozzle was moved over the recumbent film in stripes at a distance of 6 mm from the sample surface and a speed of 12 m/min, and in this way the films were treated with air-plasma.

Bonding and Measurement

Two film strips in each case were bonded to one another over a length of 50 mm at the end of the strip, and with an adhesive-layer thickness of about 1 mm, after the lying time indicated in Table 1, with bonding taking place at 23° C., 50% relative humidity, using Sikadur®-Combiflex®, without further pretreatments. After curing at 23° C. and 50% relative humidity for 6 days, the peel resistance was determined in accordance with EU 12316-2 by means of a Zwick 1446 tensile testing machine. The peel resistance values measured are given in Table 1.

TABLE 1

Peel resistance values of different thermoplastics with and without air-plasma treatment after different lying times.

| | Peel resistance [N/50 mm] | | |
|---|---|---|---|
| | | air-plasma-treated lying time[‡] | |
| Sample | untreated | 1 d | 28 d |
| Hypalon ® 45 | 10 | 80 | 140 |
| Low-density polyethylene (LDPE) | n.m.[†] | 105 | 100 |
| Ethylene-vinyl acetate (E/VA = 75/25) | 5 | 300 | 325 |
| Hypalon ® 45/EVA = 17/1 | 5 | 100 | 160 |
| Hypalon ® 45/LDPE/EVA = 17/1/1 | 5 | 115 | 170 |
| Sikadur ®-Combiflex ® tape | 5 | 355 | 325 |

[†]n.m. = not measurable, i.e. the sample could not be clamped in without the sample specimen undergoing adhesive fracture.
[‡]Samples were stored at 23° C. and 50% relative humidity for the time indicated, after air-plasma treatment.

2. Different Storage Conditions after the Air-Plasma Treatment

Different conditions were implemented during the storage time between the treatment with air-plasma at atmospheric ambient pressure and bonding.

Sikadur®-Combiflex® tapes 1.5 mm thick and 20 cm wide were treated with an air-plasma at atmospheric ambient pressure, via a plasma generator from Plasmatreat having two adjacent rotating nozzles, with a treatment width of 100 mm each, at a distance from the sample surface of 6-8 mm and at a speed of 12 m/min. In the course of this operation the film was moved beneath the stationary plasma source. The pressure of air needed for the plasma was 4 bar. Following the air-plasma pretreatment the film tapes were wound loosely without release films.

After the air-plasma treatment the films were stored as follows for the time indicated in Table 2:
- 23° C.: the samples were stored in roll form, unpackaged, at ambient temperature and in contact with air
- 50° C.: the samples were stored in roll form, unpackaged, in a forced-air oven at 50° C.
- +60° C./−30° C.: the samples in roll form, unpackaged, were subjected to 3 hot/cold cycles, by being stored in alternation for one week at +60° C. in a forced-air oven and then for one week at −30° C. in a freezer, in contact with air.

The bonding of the tapes and measurement of the peel resistance values were carried out as described above. The peel resistance values measured are given in Table 2.

TABLE 2

Different storage and different lying times

| | Lying time** | Peel resistance [N/50 mm] | Fracture mode* |
|---|---|---|---|
| Untreated | | 50 | A |
| Air-plasma-treated | 0 (at 23° C.) | 335 | F |
| | 10 w (at 23° C.) | 330 | F |
| | 6 m (at 23° C.) | 320 | F |
| | 16 m (at 23° C.) | 305 | F |
| | 26 m (at 23° C.) | 335 | F |
| | 32 m (at 23° C.) | 320 | F |
| | 2 m (at 50° C.) | 300 | F |
| | 12 m (at 50° C.) | 295 | F |
| | 26 m (at 50° C.) | 335 | F |
| | 6 w (+60° C./−30° C.) | 350 | F |

*A = adhesive fracture, F = film extension until film fracture
**d = days, w = weeks, m = months A further series of experiments was conducted with Sikadur®-Combiflex® tapes 2.0 mm thick and 10 cm wide. They were treated by means of an air-plasma at atmospheric ambient pressure, using a plasma generator from Plasmatreat with a rotating nozzle, with a treatment width of 100 mm, at a distance from the film surface of 8 mm and at a speed of 12 m/min. The pressure of air needed for the plasma was 4 bar. After the air-plasma pretreatment the film tapes were wound loosely without release films.

The storage conditions, bonding and measurements of the peel resistance values took place as described above.

The peel resistance values measured are given in Table 3.

TABLE 3

Different storage and different lying times

|  | Lying time** | Peel resistance [N/50 mm] | Fracture mode* |
|---|---|---|---|
| Untreated |  | 65 | A |
| Air-plasma-treated | 0 (at 23° C.) | 485 | S |
|  | 6 m (at 23° C.) | 500 | S |
|  | 12 m (at 23° C.) | 515 | S |
|  | 19 m (at 23° C.) | 475 | S |
|  | 26 m (at 23° C.) | 490 | S |
|  | 7 d (at 50° C.) | 390 | S |
|  | 14 d (at 50° C.) | 430 | S |
|  | 6 m (at 50° C.) | 490 | S |
|  | 12 m (at 50° C.) | 425 | S |

*A = adhesive fracture, S = shank extension
**d = days, w = weeks, m = months

3. Different Adhesives

Sikadur®-Combiflex® tapes 2 mm thick and 20 cm wide were treated with air-plasma at atmospheric ambient pressure using a plasma generator from Plasmatreat with two rotating nozzles, with a treatment width of 100 mm per nozzle, at a distance from the sample surface of 8-10 mm and at a speed of 12 m/min. The pressure of air needed for the plasma was 6 bar. The tapes were pretreated with air-plasma on both sides. Following the air-plasma treatment the film tapes were wound loosely without release films.

2 unpretreated and 2 air-plasma-treated strips 15 cm long were bonded using different adhesives, over a bond length of 10 cm, after a lying time of 8 minutes, bonding taking place to sandblasted concrete (Sikaflex®-11FC, SikaBond®-T-14, Sikadur®-Combiflex®) or to steel (SikaFast®-5211).

The concrete (garden slab) was sandblasted and then further pretreated with a primer as follows:

Sikadur®-Combiflex®: no primer
Sikaflex®-11 FC:Sika® primer-3 (Sika Schweiz AG), 30 minutes' flash-off time
SikaBond®-T14:SikaTack® panel primer (Sika Schweiz AG), 30 min. flash-off time
The steel was pretreated with Sika® ADPrep-5901 (Sika Schweiz AG) and flashed off for 10 minutes.

The Sikadur®-Combiflex® tapes were not subjected to any further pretreatments prior to bonding.

The sample specimens produced in this way were tested after a cure time of 7 days at room temperature by peeling using pointed-end tweezers. In this test the loose end of the film was gripped with the tweezers and wound using the tweezers. When the bond was reached, twisting force was applied to the tweezers for qualitative assessment of the peel adhesion, in accordance with the following assessment code:

1=not peelable (good)→film fracture
2=moderately peelable (adequate)→peeling possible with deformation of the tape
3=easily peelable (poor)

TABLE 4

Different adhesives

| Adhesive | Untreated | | Air-plasma-treated | |
|---|---|---|---|---|
|  | Assessment | Fracture* | Assessment | Fracture* |
| Sikadur ®-Combiflex ® | 3 | 100% A | 1 | 100% C(F) |
| Sikaflex ®-11 FC | 3 | 100% A | 2 | 90% A |
|  |  |  |  | 10% C(Ad) |
| SikaBond ®-T14 | 3 | 100% A | 1 | 95% C(Ad) |
|  |  |  |  | 5% C(F) |
| SikaFast ®-5211 | 3 | 100% A | 1 | 100% C(F) |

*A = adhesive fracture, C(Ad) = cohesive fracture in adhesive, C(F) = cohesive fracture in film

The invention claimed is:

1. A method of bonding two substrates S1 and S2 by means of adhesives, comprising:
   (i) treating a surface of the substrate S1 with an air-plasma at atmospheric ambient pressure at least in a region to be bonded;
   (ii) applying an adhesive to the air-plasma-pretreated surface of the substrate S1 or to a surface of the substrate S2;
   (iii) joining the substrate S2 with the air-plasma-pretreated surface of the substrate S1 within the adhesive's open time; and
   (iv) curing the adhesive,
   wherein
       the substrate S1 is a thermoplastic film comprising at least one copolymer CP of at least two monomers selected from the group consisting of vinyl acetate, vinyl alcohol, styrene, ethylene, propylene, butadiene, esters of (meth)acrylic acid, and mixtures thereof, and in addition to the copolymer CP, at least one chlorosulfonated polyethylene, and
       the surface of the thermoplastic film is not subjected to further treatments.

2. The method of claim 1, wherein the second substrate S2 is a mineral substrate.

3. The method of claim 2, wherein the mineral substrate is cement or masonry.

4. The method of claim 1, wherein the adhesive is a polyurethane adhesive, a (meth)acrylate adhesive, an epoxy resin adhesive or an adhesive based on alkoxysilane-functional prepolymers.

5. The method of claim 4, wherein the adhesive is a room-temperature-curing adhesive.

6. The method of claim 1, wherein the copolymer CP is an ethylene/vinyl acetate copolymer or a (meth)acrylate/styrene/acrylonitrile copolymer.

7. The method of claim 6, wherein the copolymer CP is a (meth)acrylate/styrene/acrylonitrile copolymer.

8. The method of claim 1, wherein the two substrates S1 and S2 are composed of an identical material.

9. The method of claim 1, wherein there lies a time of at least one week between (i) treating the surface of the substrate S1 and (ii) applying the adhesive.

10. The method of claim 1, wherein at least one rotating nozzle is used for the air-plasma treatment.

11. The method of claim 1, wherein the copolymer CP is an ethylene/vinyl acetate copolymer.

12. The method of claim 1, wherein there lies a time of at least 6 months between (i) treating the surface of the substrate S1 and (ii) applying the adhesive.

13. The method of claim 1, wherein a weight ratio of the chlorosulfonated polyethylene to the copolymer CP is from 0.5 to 40.

* * * * *